Jan. 15, 1963
W. C. JOHNSON
3,073,948
PROCESS FOR WELDING BY FUSING A METAL
STRIP AND ARTICLE PRODUCED
Filed June 25, 1959
4 Sheets-Sheet 1
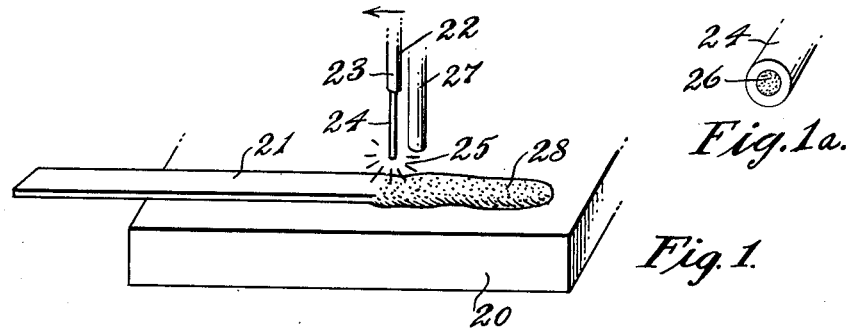
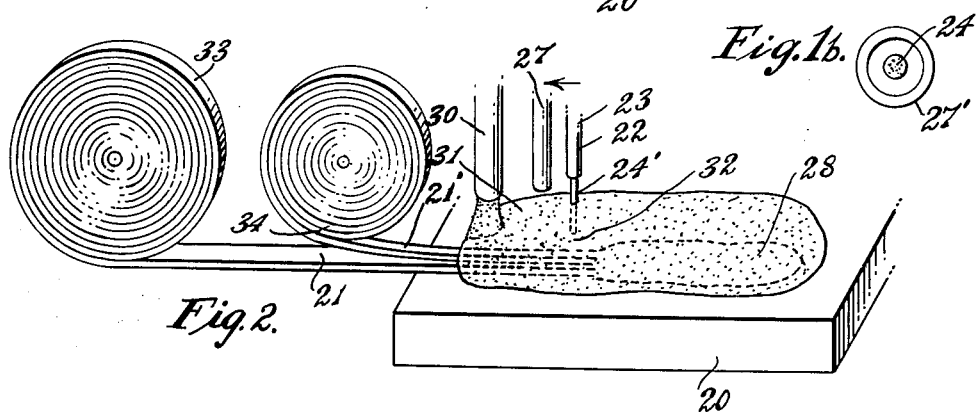
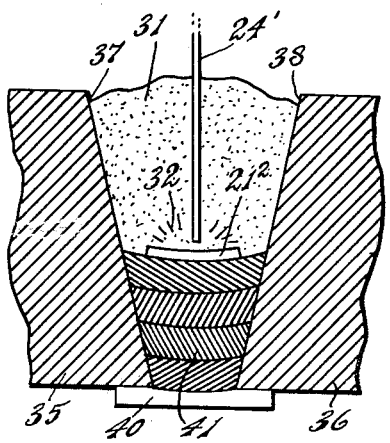
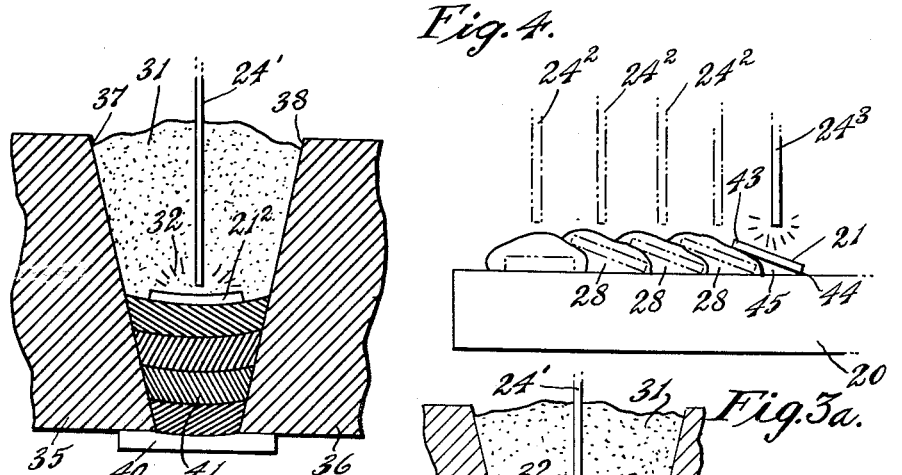
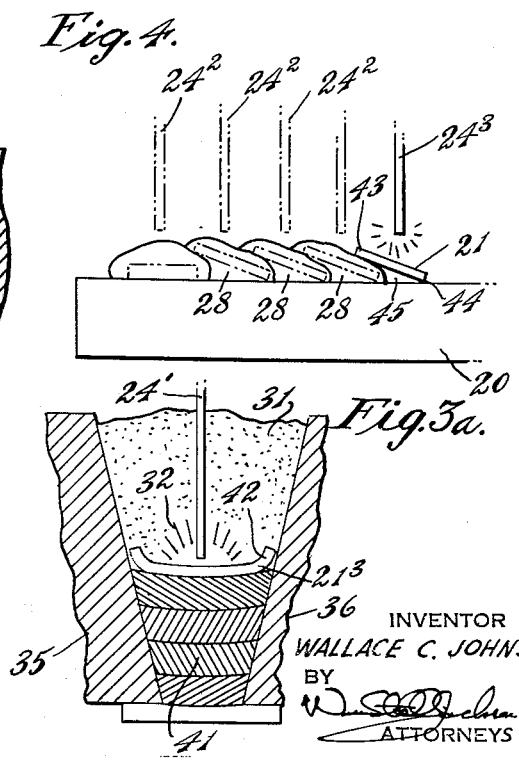
INVENTOR
WALLACE C. JOHNSON
BY
ATTORNEYS Jan. 15, 1963 W. C. JOHNSON 3,073,948
PROCESS FOR WELDING BY FUSING A METAL
STRIP AND ARTICLE PRODUCED
Filed June 25, 1959 4 Sheets-Sheet 2
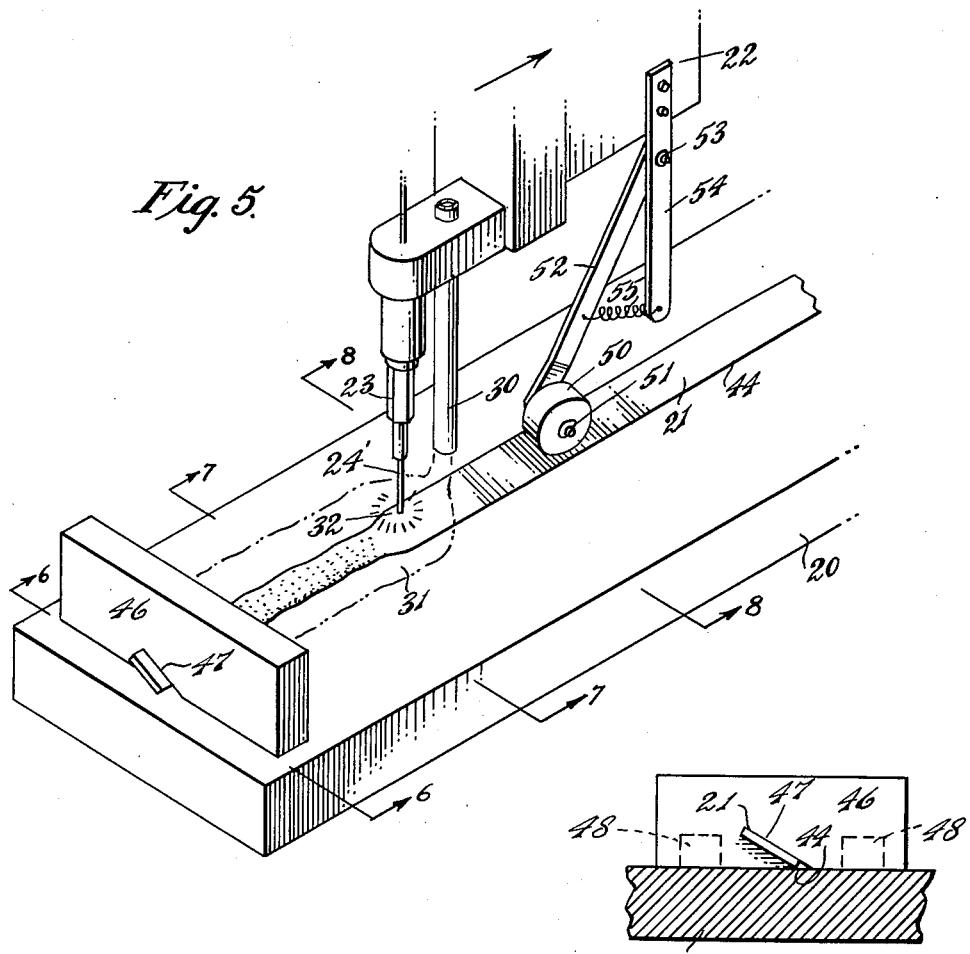
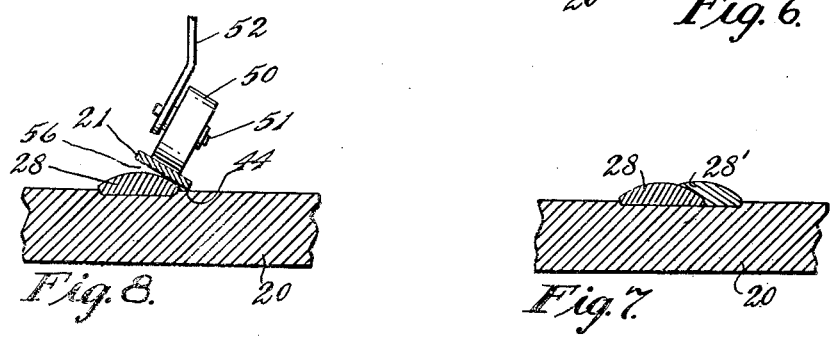
INVENTOR
WALLACE C. JOHNSON
BY
ATTORNEYS

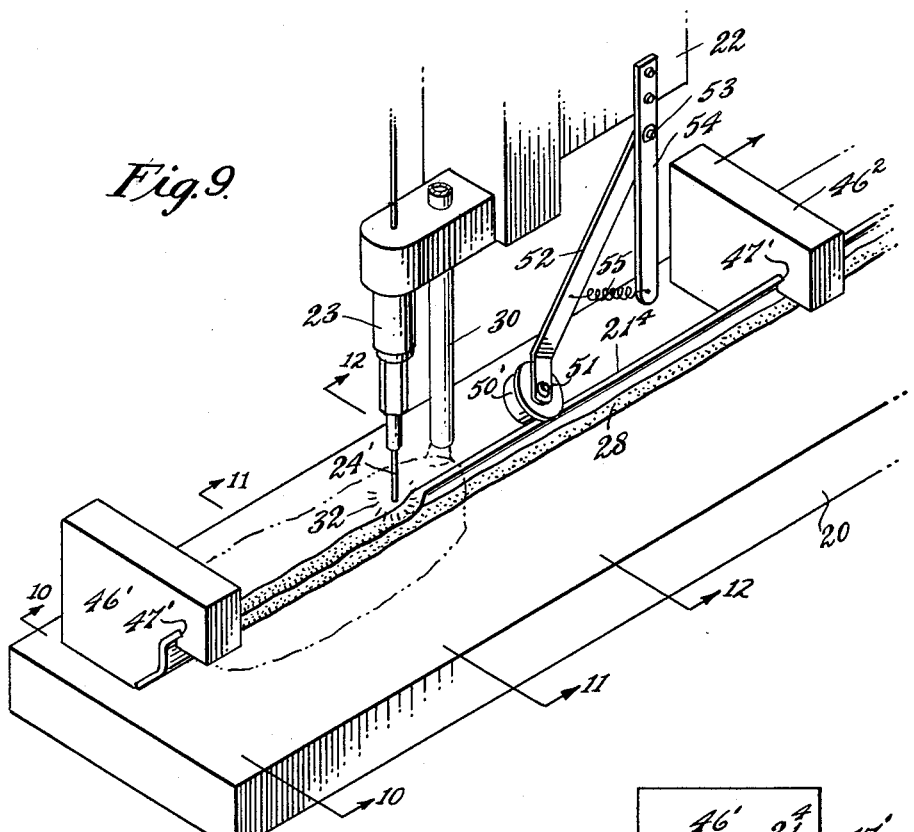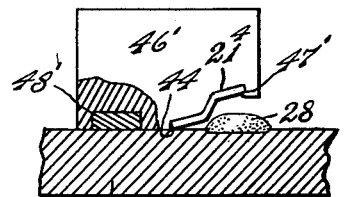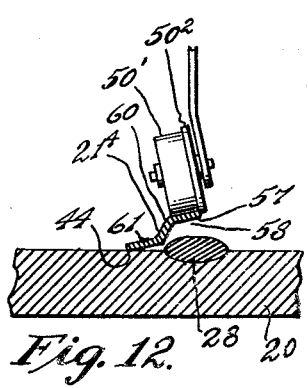

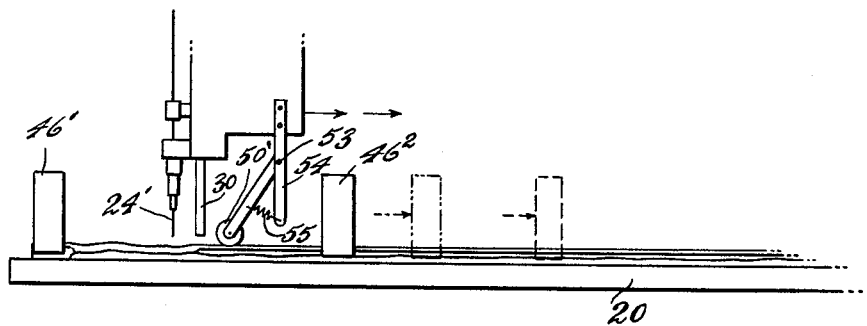
Fig. 13.
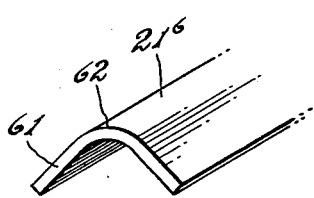
Fig. 14.
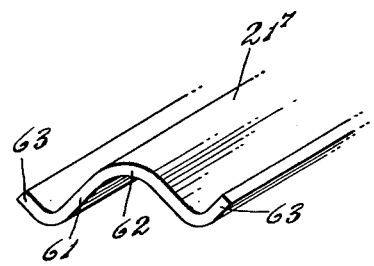
Fig. 15.
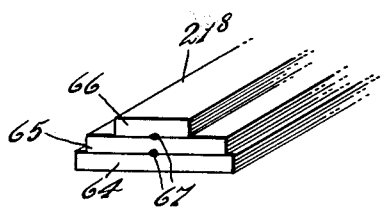
Fig. 16.
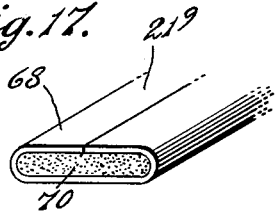
Fig. 17.
Fig. 17a.
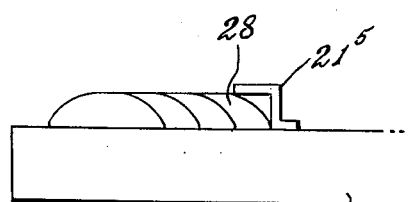
Fig. 18.
INVENTOR
WALLACE C. JOHNSON
BY
ATTORNEYS

United States Patent Office 3,073,948
Patented Jan. 15, 1963

3,073,948
PROCESS FOR WELDING BY FUSING A METAL STRIP AND ARTICLE PRODUCED
Wallace C. Johnson, Hamden, Conn., assignor to Arcos Corporation, Philadelphia, Pa., a corporation of Pennsylvania
Filed June 25, 1959, Ser. No. 822,808
14 Claims. (Cl. 219—137)

The present invention relates to electric arc welding, using consumable weld strips applied to the work, to apparatus therefor and to weld strips themselves.

This application has been divided and the subject matter relating to the apparatus has been embodied in divisional application Serial No. 18,986, filed March 31, 1960, for Apparatus for Welding by Fusing of Metal Strip. The subject matter directed to a weld strip has been embodied in divisional application Serial No. 19,038, filed March 31, 1960, for Weld Strip.

A purpose of the invention is to decrease the penetration of a welding bead into the work (that is, the base metal or the previous bead or beads of welding) so as to minimize the influence of the composition of the work on the new weld bead which is formed.

A further purpose is to deflect the arc from a consumable welding electrode so that it will not deeply penetrate the work.

A further purpose is to minimize hot cracking, underbead cracking and toe-cracking in welding of alloy steels.

A further purpose is to improve the quality of single pass overlays on steel and other base metals.

A further purpose is to extend a rectangular consumable weld strip having a width as sheared of between ¼ and 3 inches, preferably between ½ and 1 inch, and a thickness of between 0.010 and 0.250 inch along and in contact with the work but to defrom the strip so that there will be space between the strip and the work, desirably maintaining the arc to the portion of the strip which is most remote from the work.

A further purpose is to hold one edge of the strip into contact with the previous weld bead and the other edge of the strip into contact with the work adjoining the previous weld bead so as to maintain the strip intermediate the two edges spaced from the work to reduce penetration.

A further purpose is to utilize a convex strip which will maintain spacing from the work intermediate its edges, and preferably to reversely bend the strip at the edges to reduce overrolling of the bead.

A further purpose in deep groove welding is to employ a concave or U-shaped strip which will tend to stop undercutting and side wall penetration.

A further purpose is to progressively uncoil or otherwise lay down the strip in the path of the arc from a consumable welding electrode as the arc advances.

A further purpose is to employ a weld strip which is narrower at the top than at the bottom.

A further purpose is to arc from the consumable welding electrode to a plurality of layers of weld strip, the layer of strip nearest the work (of steel or the like) minimizing intermingling of alloys, and permissibly being of very low carbon iron or steel.

A further purpose is to provide a flux core in the rectangular weld strip and permissibly also to provide a passage in the strip through which protective gas can be introduced.

A further purpose is to position the weld strip against the work ahead of the arc.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a diagrammatic perspective of a welding operation according to the present invention.

FIGURE 1a is a sectional perspective of the consumable welding electrode of FIGURE 1.

FIGURE 1b is a bottom plan view of a modified form of welding electrode and gas nozzle useful in the invention.

FIGURE 2 is a view similar to FIGURE 1 showing a variation.

FIGURE 3 is a transverse section through a welding groove showing a deep groove welding operation being performance in accordance with the invention.

FIGURE 3a is a view similar to FIGURE 3 showing a variation.

FIGURE 4 is a diagrammatic elevation showing an overlaying operation being performed in accordance with the present invention.

FIGURE 5 is a diagrammatic perspective showing a welding operation according to the invention which utilizes a flat strip held at an angle.

FIGURES 6, 7 and 8 are fragmentary sections respectively on the lines 6—6, 7—7 and 8—8 of FIGURE 5.

FIGURE 9 is a diagrammatic perspective showing a modified form of the mechanism of FIGURES 5 to 8 utilizing clamps for the welding strip.

FIGURES 10, 11 and 12 are sections of FIGURE 9 respectively on the lines 10—10, 11—11 and 12—12.

FIGURE 13 is a diagrammatic elevation showing successive steps in the operation of the device of FIGURES 9 to 12.

FIGURES 14, 15, 16, 17 and 17a are fragmentary perspectives showing different forms of welding strips according to the invention.

FIGURE 18 is an end elevation showing overlay welding being accomplished by a further modified form of strip according to the invention.

Describing in illustration but not in limitation and referring to the drawings:

In the prior art considerable difficulty has been encountered due to excessively deep penetration by the arc from a consumable electrode. For example, if it is desired to form a corrosion resistant cladding layer on plain carbon steel, it is of course well known that the properties of such a cladding layer, consisting for example of either chromium-nickel or straight chromium stainless steel, will be undesirably affected by carbon pickup from the base metal, and dilution of chromium and nickel from the cladding. Unfortunately, however, using well known techniques of welding with consumable welding electrodes, the penetration into the base metal is usually quite deep, often to the order of ¼ to ½ inch in submerged arc welding. It may therefore be necessary to apply three successive layers before a layer of cladding is obtained which is sufficiently free from carbon pickup.

It is also believed that excessive penetration is a cause of serious difficulty in other types of welding. For example, hot cracking, under-bead cracking and toe-cracking, and also low impact values adjacent the weld, have frequently been encountered in welding low alloy steels by automatic methods especially submerged arc welding. Examples of such steels are USS T-1 and HY-80 having the following analyses:

USS T-1:                                              Percent
    C ------------------------------ 0.10 to 0.20.
    Mn ----------------------------- 0.60 to 1.00.
    P ------------------------------ 0.040 max.
    S ------------------------------ 0.050 max.
    Si ----------------------------- 0.15 to 0.35.
    Ni ----------------------------- 0.70 to 1.00.

USS T-1:

| | Percent |
|---|---|
| Cr | 0.40 to 0.80. |
| Mo | 0.40 to 0.60. |
| V | 0.03 to 0.10. |
| Cu | 0.15 to 0.50. |
| B | 0.002 to 0.006. |

H.Y.-80 (thin plate):

| | |
|---|---|
| C | 0.22 max. |
| Mn | 0.10 to 0.40. |
| S | 0.045 max. |
| P | 0.040 max. |
| Si | 0.12 to 0.38. |
| Ni | 1.93 to 2.57. |
| Mo | 0.13 to 0.27. |
| Cr | 0.84 to 1.46. |

It is also believed that excessive weld penetration is a common cause of wall penetration and undercutting in deep groove welding. It also causes trapping of slag and forming of stress raisers.

One of the important advantages of the present invention is that penetration of the work, including the base metal and previous weld beads, is reduced to a minimum and subject to close control. While there is of course in the present invention sufficient penetration to assure adequate integration between the new weld bead and the work, there is not a deep plowing penetration such as has been encountered commonly in automatic submerged arc welding in the prior art. Thus it is possible in accordance with the present invention to obtain the advantages of high productivity and good welding quality obtained from submerged arc welding, without the corresponding disadvantages.

For example, by the present invention it is possible to produce corrosion resisting cladding layers on reactors and pressure vessels which are relatively free from dilution by the work.

When welding according to the present invention it has been found that the carbon pickup from work of AISI 1030 analysis in the first stainless steel pass was about the same as the carbon pickup obtained by standard submerged arc welding in the third layer of weld beads in the prior art.

The present invention also makes it possible to weld low alloy steels with less difficulty from hot cracking, under-bead cracking and toe-cracking and with better impact properties.

It is also possible by the present invention to minimize side wall penetration and undercutting in deep groove welding.

In FIGURE 1, I illustrate a plate 20 suitably of plain carbon steel constituting the work on which an overlaying operation is being performed according to the present invention. A rectangular weld strip 21 is placed on top of the work with the bottom of the strip resting against the work. The strip 21 is of a consumable metallic alloy, which, while it may in some cases be plain carbon steel, will ordinarily be of higher alloy steel such as chromium-nickel or straight chromium stainless steel, where the base metal is steel.

It is important that the weld strip be relatively thin and relatively wide so that the arc can be conducted continuously against the strip rather than directly to the work. It is also very important according to the invention that it be possible to obtain complete fusion of the strip in conjunction with consumption of the consumable welding electrode and fusion of the surface of the work in a single pass. For these reasons it is quite important to use a strip which will have a width of between ¼ and 3 inches, preferably between ½ inch and 1 inch. Since the strip is in some cases formed in cross section, this width dimension is a developed width, and it will be understood that if the strip is convex or Z-shaped, this width is the width when the strip is stretched out flat. It is also important that the strip be of a thickness between 0.010 and 0.250 inch.

The strip must be in contact with the work so that the current of the arc can flow through the consumable electrode, through the strip, and through the work.

I illustrate in FIGURE 1 a suitable welding machine 22 moving in the direction of the arrow, and having a welding head 23 which advances a consumable welding electrode 24 so as to maintain an arc 25 to the strip.

It is important that flux be available, and in FIGURE 1a, I show the electrode 24 provided with a flux core 26.

In order to exclude air, I also show a nozzle 27 moving with the welding bead, supplying a protective gas, such as, for example, carbon dioxide or an inert gas like argon or helium, or a mixture thereof. The nozzle 27 may be behind the electrode as in FIGURE 1, or ahead of the electrode as in FIGURE 2, or the nozzle 27' may surround the electrode as in FIGURE 1b. In any case the nozzle will be effective to supply blanketing gas to the arc.

As the welding machine progresses, it is important that the heat input (amperage) be sufficient to completely fuse the welding strip 21 and fuse the adjoining portion of the work so as to join with the weld electrode to form a welding puddle which contains metal from the work, metal from the weld strip, and metal from the welding electrode. This results in producing a weld bead 28 of unusually high quality, while assuring that there will be a minimum of penetration of the work.

The presence of the strip in the path of the arc deflects the limits of the arc so that it will not produce the deep penetration which otherwise would occur. Thus it is possible to make single pass overlays which have much lower pickups of carbon and other contaminating materials from the base metal. Furthermore it is possible to reduce the dilution of chromium and nickel in stainless steel.

It is also to be noted that the strip 21 melts in one pass without twisting or pulling away, and without trapping slag.

It will be evident that in the preferred embodiment the weld strip will be progressively unrolled or uncoiled or laid down like a carpet directly under the traveling arc, as the arc advances.

In FIGURE 1, I illustrate automatic visible arc welding. It is believed, however, that the principles of the invention find wide application in submerged arc welding as shown in FIGURE 2. In this case the welding machine 22 is advancing with its welding head 23 feeding consumable metallic electrode 24' to maintain the arc. A flux nozzle 30 is depositing flux 31 for covering the submerged arc 32. An optional nozzle 27 is supplying protective gas. Continuously unrolling from a coil 33, ahead of and in line with the path of the arc 32, is the consumable weld strip 21, which is being laid down against the work 20. Also, beyond the top of the weld strip 21, there is continuously laid down ahead of and in line with the arc a second consumable weld strip 21', which is continuously being uncoiled from the coil 34.

In the usual case, the weld strip 21 will have an analysis which is different from the analysis of the work and the analysis of the weld strip 21'. For example, if the work 20 is plain carbon steel AISI 1030, the weld strip 21 in a particular case may be very low carbon steel or ingot iron while the weld strip 21' is stainless steel of low carbon content.

As a consequence, in a single pass the arc 32 forms a welding puddle containing metal from the work, metal from the weld strip 21, metal from the weld strip 21', and metal from the consumable welding electrode 24', but the bead 28 which forms from the complete fusion of weld strips 21 and 21' is much lower in carbon content than if a single stainless steel welding strip were used without the low carbon steel or ingot iron weld strip 21.

Thus, in an actual case where a single stainless steel weld strip was used in the technique of FIGURE 2, the carbon content of the bead was 0.075 percent, whereas with the ingot iron strip 21 and the stainless steel strip 21' having the same total cross section as the single stainless steel weld strip previously used, the analysis of the weld bead was 0.050 percent carbon.

The invention may be applied also to other types of welding, such as deep groove welding shown in FIGURE 3.

In this instance two work plates 35 and 36, having weld bevels cut in them at 37 and 38 to form a groove, were placed to abut end to end. A backing strip 40 was applied and successive weld beads 41 were placed, it being evident that they could be applied according to the present invention if desired.

Over the previous weld bead, a weld strip $21^2$ according to the present invention is placed running longitudinally of the groove and suitably of the cross section already described. A consumable welding electrode 24' is introduced along with a layer of flux 31 for submerged arc welding. The electrode 24' progresses longitudinally of the groove under the action of a suitable welding machine as previously mentioned and maintains an arc 32 to the weld strip $21^2$. The heat input as in the other cases is sufficient to completely fuse the weld strip $21^2$ in a single pass and form a weld puddle, which contains metal from the work (the previous pass), metal from the weld strip $21^2$ and metal from the consumable welding electrode 24'. The result is to form a new pass which fills the weld groove across from one side to the other and eliminates the need of multiple split passes.

The weld strip $21^2$ is slightly concave to aid in seating in the weld groove on the previous pass.

It is sometimes important to prevent side wall penetration and undercutting by the arc. In FIGURE 3a, I show a weld similar to that of FIGURE 3 in which the weld strip $21^3$ is of U-shaped formation with slightly upturned edges 42 adjoining the edges of the groove. The entire weld strip is melted in a single pass but the edges 42 are protective of the weld groove against side wall penetration and undercutting. It has been found that upturned edges of the order of $\frac{1}{16}$ inch high are effective for this purpose. The strip in melting uses much of the normal heat input (from a single arc at say 600 amperes) and so reduces the width of the heat affected zone. This is particularly important in butt welding high tensile steels.

I have discovered that the weld penetration can be further retarded by placing the weld strip so that it is spaced from the work over a portion of its width. The space between the weld strip and the work may contain air or it may contain protective gas if a gaseous atmosphere is being used, but in any case it tends to decrease penetration. Also, for most effective results, the arc should be maintained with the weld strip at a location on the strip where the air or gas gap is greatest.

The spacing between the arc strip and the work should not, however, be great enough to permit too much flux or slag to collect between the arc strip and the work. An air gap or gas gap of $\frac{1}{8}$ inch in depth is quite satisfactory for most purposes, and it will preferably be between $\frac{1}{32}$ and $\frac{1}{4}$ inch.

In FIGURE 4, I illustrate an overlay by a technique which I refer to as shingling. In this case a succession of previous weld beads 28 have been laid down overlapping one another using successive electrode positions shown at $24^2$. In making the next bead a weld strip 21 is placed at an angle or inclined to the top of the work, a suitable angle being 20 or 30 degrees. The strip in this case rests against the previous bead at 43 at its upper edge and rests directly against the work 20 at 44 at its lower edge with an air or gas gap 45 under its middle portion.

In making the next pass the consumable welding electrode $24^3$ is positioned opposite the air or gas gap 45, and as it moves along the strip it completely fuses the strip 21 and forms the new bead from a composite of metal from the work (the base metal and the previous bead), metal from the strip, and metal from the consumable welding electrode $24^3$. This assures the advantage of reduced penetration. It will of course be understood that flux is applied, in FIGURE 4, at the point of welding, but it has been omitted in the drawings for clarity in illustration. Also a protective gaseous atmosphere will be used if desired.

A welding machine which establishes the condition shown in FIGURE 4, with certain modifications, is illustrated in FIGURES 5 to 8 inclusive.

In this case the weld strip 21 at the starting end is placed in a clamp 46 which has an angular slot 47 which holds the strip 21 at an angle so that one edge engages the work at 44. The clamp 46 is preferably held to the work by permanent magnets 48 which are set in the bottom of the clamp.

There is an angularly placed roller 50 on the welding head, moving ahead of the bead, the welding electrode, the gas nozzle if any and the flux, which tends to maintain pressure on the edge of the welding strip 21 at 44 against the work. The roller idles on an axle 51 mounted on an arm 52 pivoted at 53 on a bracket 54 advancing with the welding head, and the roller is spring biased by a helical tension spring 55 acting between the bracket 54 and the arm 52 to resiliently urge the edge 44 of the weld strip against the work. If desired in this form, the weld strip 21 is somewhat spaced at 56 from the previous welding bead so as to further reduce penetration, the arc being maintained with the upper portion of the strip 21 which is most spaced from the work. The effect is to lay down a second welding bead 28' by completely fusing the strip 21 in the single pass.

In some cases it is desirable to make a Z-shaped weld strip $21^4$ as shown in the form of FIGURES 9 to 12 inclusive. In this case, the clamp 46' at the start of the weld has a somewhat modified groove 47', which holds the weld strip canted so as to engage the work only at 44 and rise above the adjoining weld bead 28. In this case, a second clamp $46^2$ is placed in advance of the welding machine where it is suitably held in place against the work by a magnet 48', and, as shown in FIGURE 13, progressively advances to more forward positions as the machine advances. This holds the strip so that the portion 57, which is suitably flat and rides the body of roller 50', is spaced at 58 from the previous weld bead 28, the sloping portion or web 60 is likewise spaced from the weld bead, and the other flange 61 is close to, but sloping up from, the work.

As a result, after complete fusion in a single pass, the weld strip $21^4$ melts down into a new weld bead $28^1$, which is a composite of metal from the work, metal from the strip, and metal from the consumable welding electrode.

To assure firm engagement of the weld strip with the work, the roller 50' has a rim $50^2$ which keeps the weld strip properly aligned and applies a component of resilient force to maintain good contact with the work.

In the form of FIGURES 9 to 12, the weld strip $21^4$ is a Z with a diagonal web. In the form of FIGURE 18, the weld strip $21^5$ is a Z with a straight web, which permits the web to rest against the previous bead and one of the flanges to rest against the work.

Various other weld strip forms having low penetration may be used. In FIGURE 14, the weld strip $21^6$ is convex with two straight legs 61 at the edges of a hump 62, along which the arc extends, at the middle.

This form of weld strip will give a heavy deposit with a shallow penetration.

In experiments with a strip 1 inch wide and 0.090 inch thick of the character of FIGURE 14, with an air gap at the middle of $\frac{3}{16}$ inch, and using current of 550 to 750 amperes A.C. with voltages of the order of 30 volts, the penetration was limited to 1/32 inch.

A weld strip of the kind of FIGURE 14 may have a tendency to give considerable roll-over, but this can be prevented by bending the edges upward at about 45 degrees as shown in FIGURE 15. In this case the weld strip 21⁷ has upturned edge portions 63 which are reversely bent with respect to the middle 62 and legs 61. Experiments with this strip using the techniques previously discussed indicate that it is very effective to prevent over-rolling.

In some cases it is desirable to use a weld strip which is narrower at the top than it is at the bottom to reduce over-rolling of the bead. A weld strip 21⁸ of this type is shown in FIGURE 16, which gets progressively narrower, in steps, from the bottom to the top. This is accomplished by using a relatively wide bottom metal strip 64, then a narrower metal strip 65, and next a still narrower top strip 66. While these strips can be separately fed as in FIGURE 2, they are desirably joined together by spot-welding at 67, in advance of use.

The total strip cross section will be within the limits of .005 and .250 square inch in the preferred embodiment.

This strip may desirably take the form of a bottom strip element 64 which is of ingot iron or low carbon steel, an intermediate strip element 65 which is of stainless steel of intermediate alloy content (for example, chromium or chromium and nickel), and a top strip element 66 which is of higher alloy content and less subject to dilution. The entire weld strip is melted at one pass.

In some cases a tubular generally rectangular weld strip may be used, as shown at 21⁹ in FIGURE 17. This consists of a sheet of the dimensions previously described which is rolled into a tube at 68, the bore of the tube being filled with alloying ingredient or flux 70. The preferable composition of the material 70 will be at least 70 percent of alloying ingredient, for example, ferrochrome, electrolytic chromium, or electrolytic nickel in powder form, the balance being calcium fluoride, limestone, calcium oxide, or a mixture thereof, permissibly with a binder of sodium silicate. A typical analysis of the material 70 when used with separate flux is 100% ferrochrome (65%). A typical analysis of the material 70 when it provides the flux is:

| | Percent |
|---|---|
| Ferrochrome (65%) | 88 |
| Sodium silicate solution | 12 |
| ($Na_2O$ to $SiO_2$ ratio 1 to 2.90.) | |
| 47° Baumé. | |

This flux before use is baked at a temperature of 400 to 900° F. and preferably about 840° F. for at least about 4 hours.

In some cases the generally rectangular weld strip 21⁹ will be used with a relatively narrow filling 70' consisting of a mixture of alloying ingredients and flux, and passages 71 at each side through the bore of the flanged tube, through which a protective gas is pumped. The protective gas may be of a character already described.

It will be evident that the holding in place of the weld strip at the point adjacent the arc is assisted by the cementing action which is exerted by the hot covering flux or slag before the weld strip becomes fully molten.

The electrical conditions will of course be varied to suit the requirements, but in any case, the heat supplied should be sufficient to fully melt the weld strip, the adjoining surface of the work, and a suitable length of consumable electrode, in a single pass. Amperages between 250 and 800 amperes are typical for automatic welding, preferably submerged arc welding, and the most usual range will be 275 to 800 amperes. The lower current values are likely to be used particularly for 3 o'clock welding. Voltages are likely to range from 28 to 35 volts and traveling speeds will be of the order of 10 to 20 inches per minute. Alternating or direct current may be used.

*Example I*

A series of weld strips of type 430 stainless steel were tested, having widths between 1/2 and 5/8 inch and thicknesses starting at 0.010 inch and increasing in steps up to 0.125 inch. The base plates being welded were of AISI 1030 steel. The consumable welding electrode was 5/32 inch diameter type 308 stainless steel wire. Flux was separately supplied under the submerged arc welding technique having the following typical, maximum and minimum percentage composition:

| | Typical | Maximum and minimum |
|---|---|---|
| Fluorspar | 8 | 4 to 12. |
| Limestone | 10 | 5 to 30. |
| Bentonite | 2 | 1 to 3. |
| Fibrous Calcium Silicate | 79 | CaO 20 to 60, $SiO_2$ 60 to 20. |
| Aluminum | 1 | 0.5 to 3. |

The aluminum content is optional. This dry powder in 100 parts by weight is mixed with 30 parts by weight of sodium silicate solution ($Na_2O$ to $SiO_2$ ratio 1 to 2.90) 47° Baumé. This flux is baked at a temperature of 400 to 900° F., and preferably about 840° F. for at least about 4 hours. The currents ranged from 470 to 600 amperes A.C., with increase of amperage for thicker strips. The voltage was increased from 28 to 35 volts for the thicker strips. The speed of travel varied between 10 and 20 inches per minute. The arc was covered with flux and the arc extended directly to the strip and melted the strip in a single pass.

Complete fusion was obtained and excellent welds. In the controls in which no weld strip was employed, the penetration was 6 mm. With a weld strip of thickness of 0.062 inch, the weld penetration was 1.5 mm., and in all cases the penetration was greatly less than that of the controls.

It will be evident that other commercial fluxes may be used in the process of the invention, which may or may not be prefused, or agglomerated.

*Example II*

Experiments as above were carried on using the same welding electrode and the same base plates, with flat weld strips with widths between 5/8 inch and 7/8 inch and thicknesses of 0.060 to 0.090 inch of type 430 stainless steel. Using a single arc traveling at 10 inches per minute and arcing to the weld strip with amperages varying from 425 to 475 amperes A.C., excellent welds were obtained with a penetration less than 1/32 inch.

*Example III*

Using the same welding electrode in the same base plate with a weld strip of type 430 stainless steel 5/8 inch wide and 0.250 inch thick with submerged arc welding technique, with an amperage of 500 amperes A.C. and a speed of 12 inches per minute, there was complete fusion and a good weld produced with a penetration of only 1/16 inch as compared with a penetration of 1/4 inch which was obtained when no strip was used.

*Example IV*

Using the same electrode and base plates and using weld strips varying in width between 5/8 inch and 7/8 inch with thicknesses varying between 0.078 and 0.100 inch, the weld strip analyses for the different sizes being in some cases type 304 stainless steel, in other cases type 430 stainless steel, and in other cases ingot iron, using 650 amperes A.C. at voltages of 28 to 34 volts and speeds of from 15 to 20 inches per minute, very satisfactory welds were obtained with complete fusion and penetration not exceeding 3/32 inch.

One of the great advantages of the present invention is that it is possible to produce a thinner cladding layer on a reactor or pressure vessel or the like with low carbon content in the cladding layer. Thus it is possible in accordance with the invention to produce an overlay as shown in FIGURE 4 having a thickness of from 1/16 to 5/16 inch, using a weld strip and an electrode of type 308 stainless steel analysis, on a backing metal of composition in the range between AISI 1005 and AISI 1035, the overlay or cladding layer having an analysis as follows:

Carbon_____ 0.070% max.
Chromium_____ 19% minimum.
Nickel_____ 9% minimum.
Molybdenum_____ 2% minimum.
Balance iron.

Because of the low carbon content corrosion resistance is unusually good.

It will be evident that the weld strip, which fully melts, greatly increases the deposition rate, since the mass of metal in one foot of weld strip will in a suitable case equal that in say four feet of electrode.

In view of my invention and disclosure, variations and modifications to meet individual whim or particular need will doubtless become evident to others skilled in the art, to obtain all or part of the benefits of my invention without copying the process, and product shown, and I, therefore, claim all such insofar as they fall within the reasonable spirit and scope of my claims.

Having thus described my invention what I claim as new and desire to secure by Letters Patent is:

1. The process of arc welding to metallic work, which comprises placing along the work a consumable weld strip having a cross sectional width of between 1/4 and 3 inches and a cross sectional thickness of between 0.010 and 0.250 inch, said weld strip having contact with the work at only a portion of its width and being spaced from the work at other portions of its width, establishing an arc from a consumable welding electrode to the weld strip, supplying flux to the arc, and progressing the arc relatively longitudinaly to the weld strip while supplying heat input sufficient to melt the weld strip at one pass and forming a weld puddle containing metal from the work, metal from the weld strip and metal from the electrode.

2. The process of claim 1, in which the arc is maintained to the weld strip at a point at which the weld strip is spaced from the work.

3. The method of claim 1, in which the weld strip is in contact with the work only at one edge of the weld strip.

4. The method of claim 1, in which the weld strip is maintained in tilted position so that it contacts the work only at one edge.

5. The method of arc welding against work which has a previous welding bead, which comprises placing a consumable weld strip having a width of between 1/4 and 3 inches and a thickness between 0.010 and 0.250 inch, resting with one side on the previous weld bead and the other side on the work beyond the previous weld bead, the weld strip extending longitudinally of the previous weld bead, establishing an arc between a consumable welding electrode and the weld strip, supplying flux to the arc, and progressing the arc with available supply of flux longitudinally of the weld strip while supplying heat input sufficient to completely fuse the weld strip at a single pass and forming a weld puddle composed of the metal of the work, the metal of the weld strip and the metal of the welding electrode.

6. The process of claim 5, which comprises maintaining the weld strip spaced from the work between the point where it engages the weld bead and the point where it directly engages the work.

7. The process of claim 6, which comprises maintaining the arc to the weld strip at the portion of the weld strip adjacent the previous weld bead.

8. The process of claim 5, in which the weld strip is of Z shape, one flange of the Z engages the previous weld bead and the other flange of the Z engages the work beyond the previous weld bead.

9. The process of electric arc welding, which comprises applying against the work a metallic consumable weld strip having a width of between 1/4 and 3 inches and a thickness between 0.010 and 0.250 inch, said weld strip engaging the work at a pair of spaced lines and being spaced from the work intermediate the spaced lines and also on both sides of the spaced lines, establishing an electric arc to the weld strip at the portion of the weld strip spaced from the work intermediate the lines of contact with the work, supplying flux to the work and progressing the arc longitudinally of the strip while maintaining the arc with the portion of the weld strip which is spaced from the work between the lines of contact, with heat input sufficient to completely fuse the weld strip in a single pass and form a weld puddle which contains metal from the work, metal from the weld strip and metal from the consumable welding electrode.

10. The process of electric arc welding, which comprises continuously applying, with one side against the work, a consumable metalic weld strip of flat tubular shape having a metal cross sectional area between 0.005 and 0.250 square inch and having in the bore of the tubular strip a charge of flux, said strip being laid down progressively along a line, said weld strip being free from lateral proximity of any other weld strip which has not previously been welded, establishing an electric arc between a consumable welding electrode and the side of said weld strip which is remote from the work, progressing said electric arc along the weld strip following said line but behind the point at which the weld strip is laid down against the work, and supplying heat sufficient to completely fuse the weld strip and produce a weld puddle containing metal from the work, metal from the weld strip, and metal from the consumable electrode.

11. The process of electric arc welding, which comprises continuously laying down with its flat side against the work a generally rectangular consumable metallic tubular weld strip having a metal cross sectional area of between 0.005 and 0.250 square inch, the strip containing in its bore a charge of flux and also having a longitudinal passage through its bore, said weld strip being laid down along a line, said weld strip being free from lateral proximity of any other weld strip which has not previously been welded, establishing an electric arc between a consumable welding electrode and the side of said weld strip remote from the work, supplying protective gas through the passage in the bore of said weld strip, and progressing the electric arc along said line longitudinally of the weld strip while maintaining heat input sufficient to completely fuse said weld strip at a single pass and establish a weld puddle containing metal from the work, metal from the weld strip and metal from the consumable electrode.

12. The process of electric arc welding to form an overlay on metallic work, using a roll of consumable weld strip and also a consumable welding electrode, which comprises continuously unrolling the weld strip and laying it down in a single line with one side against the work, the weld strip having a cross sectional width between one quarter and three inches and a cross sectional thickness between 0.010 and 0.250 inch, the weld strip being free from lateral proximity to any other weld strip which has not been previously united to the work by welding and the weld strip only being applied as the weld advances, establishing an arc between the consumable welding electrode and the weld strip which has been laid down against the work, said arc always extending to the weld strip as distinguished from directly to the work, supplying flux to the arc, progressing the consumable electrode and the arc longitudinally along the weld strip but behind the point at which the weld strip is being laid down against the work while supplying heat input sufficient to completely melt the weld strip in one pass and form the metal from the work, the metal from the weld strip and the metal from the consumable electrode into a single weld bead, thus forming one weld bead, continuously unrolling the weld strip and laying it down in a single line with one edge against the weld bead thus formed and one side resting against the work, the weld strip thus laid down being free from lateral proximity from any other weld strip which has not been previously united to the work by welding and the weld strip only being applied as the weld advances, establishing an arc between the consumable welding electrode and this weld strip which has just been laid down against the work, said arc always extending to the weld strip as distinguished from directly to the work, supplying flux to the arc, progressing the consumable electrode and the arc longitudinally along the weld strip but behind the point at which the weld strip is being laid down against the previous weld bead and the work while supplying heat input sufficient to completely melt the weld strip in one pass and form the metal from the work, the metal from the weld strip and the metal from the consumable electrode into another weld bead.

13. The process of overlay electric arc welding on metallic work, using a roll of weld strip and a consumable welding electrode, which comprises continuously unrolling the weld strip and laying it down against the work, the weld strip having a metal cross section which is widest at the bottom where it engages the work and narrow at the top remote from the work, and the weld strip having a metal cross sectional area of between 0.005 and 0.250 square inch, the weld strip being free from lateral proximity to any other weld strip not previously united to the work by welding, establishing an electric arc from the consumable welding electrode to the narrow top portion of the weld strip and by the relative thickness of the weld strip compared to its width at the top limiting penetration, applying flux to the arc, progressing the arc along the weld strip at the narrow top thereof behind the point at which the weld strip is being laid against the work, while maintaining sufficient heat input to completely fuse the weld strip in a single pass and to form a weld puddle containing metal from the work, metal from the weld strip and metal from the welding electrode, thus forming one weld bead, continuously unrolling said weld strip and laying it down with one edge against the previously formed weld bead and one side against the work, the weld strip thus laid down being free from lateral proximity to another weld strip not previously united to the work by welding, establishing an electric arc from the consumable welding electrode to the narrow top portion of the weld strip and by the relative thickness of the weld strip compared to its width at the top limiting penetration, applying flux to the arc, and progressing the weld along the weld strip at the narrow top thereof behind the point at which the weld strip is being laid against the previous weld bead and the work, while maintaining sufficient heat input to completely fuse the weld strip in a single pass and to form a weld puddle containing metal from the work, metal from the weld strip and metal from the welding electrode, thus producing a second weld bead.

14. The process of overlay electric arc welding of a corrosion resisting alloy which is harmed by substantial carbon content on steel having relatively high carbon content, using rolls of weld strip and a consumable welding electrode, which comprises continuously unrolling and laying down against the steel work first a consumable weld strip of iron having low carbon content compared to the steel work, unrolling and progressively laying down on top of the first weld strip a second consumable weld strip having a composition to provide a corrosion resisting alloy, both of said first and second weld strips being laterally free from proximity to other weld strips which have not previously been welded, establishing an electric arc between the consumable welding electrode and both of said first and second weld strips from the side of the weld strips remote from the work, progressing the electric arc longitudinally of the weld strips along the same while applying heat input sufficient to completely fuse both said weld strips in one pass, while at the same time obtaining a carbon content in the weld deposited metal which is less than the carbon content in the steel work, thus producing one weld bead, continuously unrolling and laying down against the weld bead thus formed and against the steel work first a consumable weld strip of iron having low carbon content compared to the steel work, unrolling and progressively laying down on top of said first weld strip the second consumable weld strip having a composition to provide a corrosion resisting alloy, both of said first and second weld strips being laterally free from proximity to any other weld strips which have not previously been united to the work by welding, establishing an electric arc between the consumable welding electrode and both of said first and second weld strips from the side of the weld strips remote from the work, and progressing the electric arc longitudinally of the weld strips along the same while applying heat input sufficient to completely fuse both said weld strips in one pass, while at the same time obtaining a carbon content in the weld deposited metal which is less than the carbon content in the steel work, thus forming a second corrosion resisting weld bead.

References Cited in the file of this patent

UNITED STATES PATENTS

| | | |
|---|---|---|
| 1,265,453 | Jones | May 7, 1918 |
| 2,003,020 | Strobel | May 28, 1935 |
| 2,330,289 | Keir | Sept. 28, 1943 |
| 2,371,823 | Jackson | Mar. 20, 1945 |
| 2,416,379 | Cohn | Feb. 25, 1947 |
| 2,427,517 | Wilson | Sept. 16, 1947 |
| 2,759,083 | Richter | Aug. 14, 1956 |
| 2,767,302 | Brashear | Oct. 16, 1956 |
| 2,927,990 | Johnson | Mar. 8, 1960 |

FOREIGN PATENTS

| | | |
|---|---|---|
| 279,886 | Great Britain | Dec. 8, 1927 |